United States Patent [19]

Hosoya et al.

[11] Patent Number: 4,758,751

[45] Date of Patent: Jul. 19, 1988

[54] THIN TYPE DC BRUSHLESS MOTOR

[75] Inventors: Toshiro Hosoya; Rintaro Kaneeda, both of Tokyo, Japan

[73] Assignee: Tobishi Industries Ltd., Tokyo, Japan

[21] Appl. No.: 901,674

[22] Filed: Aug. 29, 1986

[30] Foreign Application Priority Data

Sep. 13, 1985 [JP] Japan .................................. 60-202985

[51] Int. Cl.⁴ .............................................. H02K 7/10
[52] U.S. Cl. ........................................ 310/41; 310/42; 310/156; 310/162; 310/257
[58] Field of Search ........ 310/216, 218, 257, 162–164, 310/49, 156, 41, 42

[56] References Cited

U.S. PATENT DOCUMENTS

| | | | |
|---|---|---|---|
| 2,323,114 | 6/1943 | Bradford et al. | 310/426 |
| 2,553,760 | 5/1951 | Gille | 310/164 |
| 2,804,680 | 9/1957 | Flagg, Jr. | 310/42 X |
| 2,814,746 | 11/1957 | Boerdijk | 310/164 |
| 4,004,168 | 1/1977 | Haydon | 310/41 |
| 4,355,248 | 10/1982 | Manson | 310/257 X |
| 4,514,655 | 4/1985 | Hosoya | 310/218 |

FOREIGN PATENT DOCUMENTS 57-91658   7/1982   Japan .

Primary Examiner—Donovan F. Duggan
Attorney, Agent, or Firm—Schwartz & Weinrieb

[57] ABSTRACT

A thin type DC brushless motor comprises a permanent magnet rotor, a stator core which is arranged concentrically with the rotor, and stator coils which are wound on the stator core. The stator core is so configured as to include a ring-shaped core portion which surrounds the permanent magnet of the rotor and which has a thickness substantially equal to the axial thickness of the permanent magnet, and a plurality of coil winding core portions which extend radially outwardly from the outer periphery of the ring-shaped core portion, which have a thickness less than the thickness of the ring-shaped core portion and which serve to dispose the stator coils thereon. The ring-shaped core portion is formed with notches so as to leave salient interpole portions disposd upon sides of the respective coil winding core portions as viewed in the rotating direction of the rotor, on front and rear surfaces of the coil winding core portions as viewed in the direction of the permanent magnet.

13 Claims, 9 Drawing Sheets

THIN TYPE DC BRUSHLESS MOTOR

BACKGROUND OF THE INVENTION

1. Field of the Invention

This invention relates to a thin type DC brushless motor or synchronous motor.

2. Description of the Prior Art

In general, regarding apparatus for use in the fields of electrical communications, business transactions, measurements, and the like, it is being aggressively attempted to improve components from the aspects of the materials used and structures thereof so as to render the entire apparatus smaller in size, lighter in weight and lower in power consumption. Accordingly, similar requirements are indispensable for electric motors which are employed in these type of apparatus. In order to meet such requirements, one of the inventors of the present application has previously developed a compact capacitor motor which is, not only miniaturized, but also thin in thickness, exhibits a high degree of performance including a large shaft output, and for which a patent application has been filed. The structure of the compact capacitor motor is as disclosed in the official gazette of Japanese Patent Applications Laid-open No. 57-91658 (corresponding to U.S. Pat. No. 4,514,655), and will be outlined with reference to FIGS. 15 and 16 of the accompanying drawings.

As shown in the half-sectional side view of FIG. 15, the prior-art compact capacitor motor comprises a frame 101, a stator core 102 which is press-fitted in the frame 101 and which is fixed to the frame 101 by bonding and/or caulking, and a rotor 103 which is arranged in the hollow central portion of the stator core 102 so as to be disposed concentrically therewith. FIG. 16 is an exploded perspective view which shows only the stator core 102 and the rotor 103 of the motor in FIG. 15. The rotor 103 is composed of a rotor core 103A, aluminum bars 103B, aluminum end rings 103C and rotary shaft 103D. As shown in FIG. 15, this rotor 103 is rotatably supported on a sleeve 105 with which the frame 101 is provided, through means of a ball bearing or an oilless metal component 104 associated with the rotary shaft 103D. As clearly shown in FIG. 16, the stator core 102 is so constructed so as to include a ring-shaped core portion 102A which surrounds the core 103A of the rotor 103 and which has a thickness substantially equal to the axial thickness of rotor core 103A, and four coil winding core portions 102B which extend radially outwardly from the outer periphery of the ring-shaped core portion 102A, which have a thickness less than the thickness of the ring-shaped core portion 102A and which serve to mount or support stator coils 106 thereon (refer to FIG. 15). According to the structure of this motor, the thickness of the coil winding core portions 102B of the stator core 102 is less than that of the ring-shaped core portion 102A, so that the outer thickness of the stator coils 106 to be disposed thereon can be reduced to a corresponding extent, and the thinness of the motor itself can be achieved.

A thinned geometry and an enhanced performance are also required of a DC brushless motor. The inventors made studies on adopting the structure of the motor as stated above, especially the structure of the stator core thereof for the DC bruchless motor, so as to thereby achieve the thinned geometry and the enhanced performance. It has been revealed, however, that when the structure of the stator core of the motor as stated before is applied to the DC brushless motor, enhancement in performance cannot be appreciably accomplished though thinning in geometry is possible.

OBJECTIVE OF THE INVENTION

An object of the present invention is to eliminate such a problem and to provide a thin type DC bruchless motor which has an enhanced performance.

SUMMARY OF THE INVENTION

According to this invention, there is provided a thin type DC brushless motor having a permanent magnet rotor, a stator core which is arranged concentrically with the rotor, and stator coils which are wound on the stator core, characterized in that the stator core is so configured as to include a ring-shaped core portion which surrounds the permanent magnet of the rotor and which has a thickness substantially equal to the axial thickness of the permanent magent, and a plurality of coil winding core portions which extend radially outwardly from the outer periphery of the ring-shaped core portion, which have a thickness less than the thickness of the ring-shaped core portion and which serve to mount or support the stator coils thereon, and that on front and rear sides of the coil winding core portions in the axial direction of the permanent magnet, the ring-shaped core portion is formed with notches so as to leave salient interpole portions on the sides of the respective coil winding core portions as viewed in the rotating direction of the rotor.

BRIEF DESCRIPTION OF THE DRAWINGS

This invention will now be described in further detail with regard to preferred embodiments as illustrated in the accompanying drawing, wherein.

DESCRIPTION OF THE PREFERRED EMBODIMENTS

Figure 1:
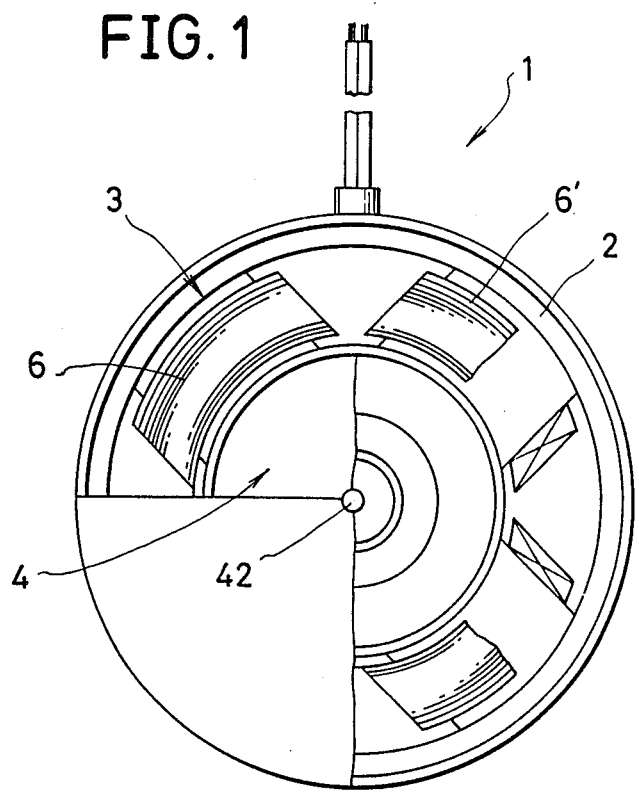
FIG. 1 is a half-sectional front view schematically showing a thin type DC brushless motor which is an embodiment of the present invention.
Figure 2:
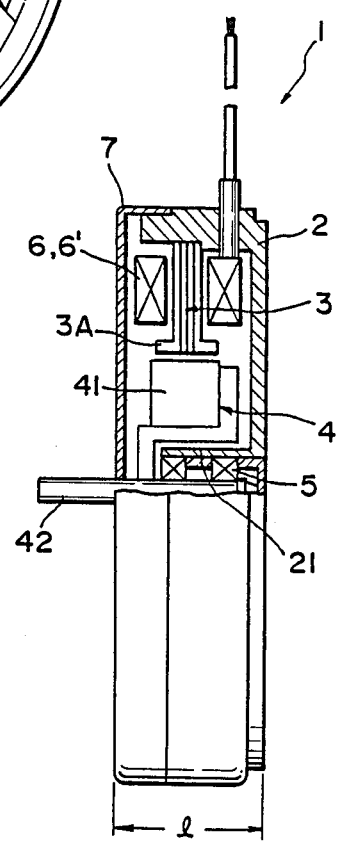
FIG. 2 is a half-sectional side view of the motor in FIG. 1.
Figure 4:
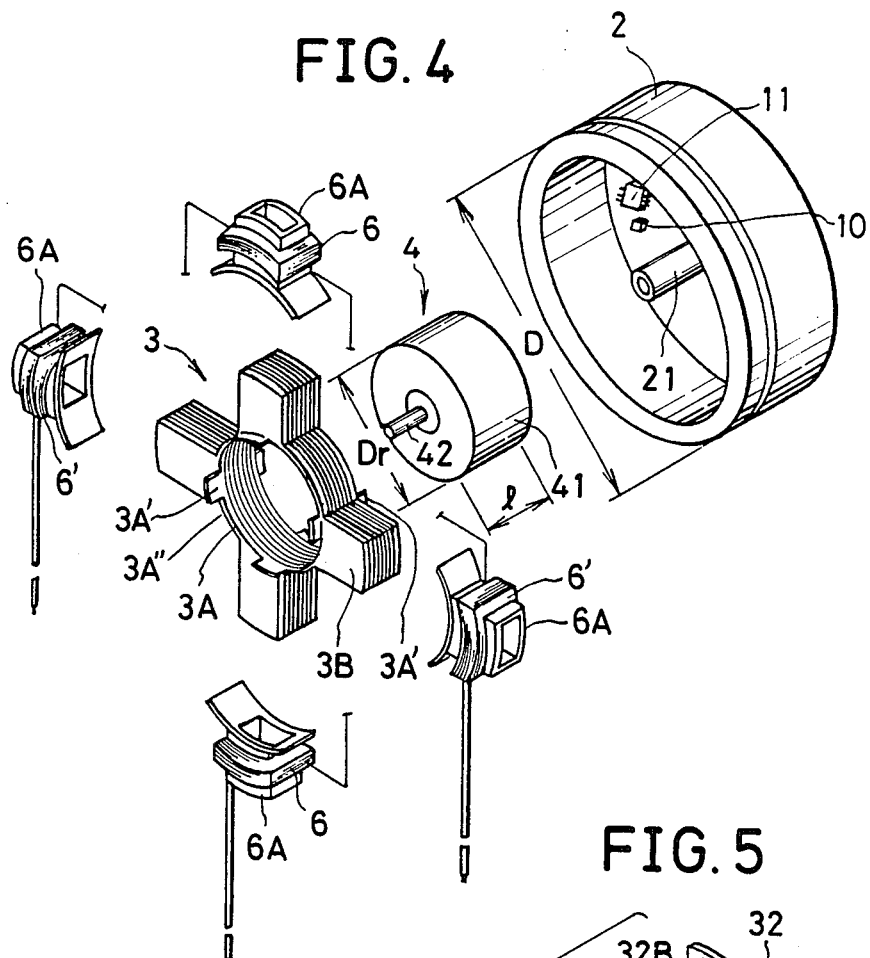
FIG. 4 is an exploded perspective view of the motor in FIG. 1.

Referring to FIGS. 1 and 2, there is shown a thin type DC brushless motor as one embodiment of this invention. This motor 1 comprises a frame 2, a stator core 3 which is press fitted in the frame 2 and which is fixed to the frame 2 by bonding and/or caulking, and a rotor 4 which is disposed within the hollow central portion of the stator core 3 so as to be concentric therewith. FIG. 4 is an exploded perspective view of the motor 1. As shown in FIG. 4, the rotor 4 itself may be of conventional form, and it is composed of a permanent magnet 41 and a rotary shaft 42. The rotor 4 is rotatably supported on a sleeve 21 with which the frame 2 is provided, through means of a ball bearing or oilless metal component 5 associated with the rotary shaft 42.

Figure 3:
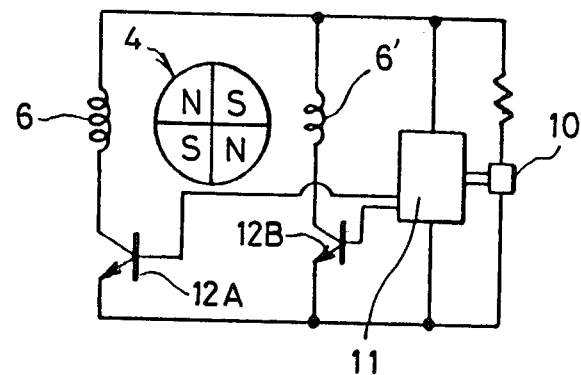
FIG. 3 is an equivalent circuit diagram of the motor in FIG. 1.

The stator core 3 has stator coils 6 and 6' disposed thereon. As illustrated in FIGS. 2 and 3, the stator coils 6 are wound in the same direction relative to the stator core 3, and the stator coils 6' are similarly wound in the same direction relative to the stator core 3. As illustrated by an equivalent circuit in FIG. 3, the energization of the respective stator coils 6 and 6' is controlled through means of a control IC 11 and switching elements 12A, 12B arranged on a side surface of the frame 2, depending upon the position of the permanent magnet type rotor 4 which is detected by means of a Hall effect element 10 disposed on the side surface of the frame 2.

According to the present invention, the stator core 3 is so configured as to have, as best shown in FIG. 4, a ring-shaped core portion 3A which surrounds the permanent magnet 41 of the rotor 4 and which has a thickness or length substantially equal to the axial thickness l of this the permanent magnet 41, and four coil winding core portions 3B which extend radially outwardly from the outer periphery of the ring-shaped core portion 3A, which have a thickness or length less than the thickness of the ring-shaped core portion 3A and which serve to dispose the stator coils 6, 6' thereon. Further, the ring-shaped core portion 3A is formed with notches 3A" on the front side and rear side of the coil winding core portions 3B in the axial direction of the permanent magnet, so as to leave salient interpole portions 3A' on the sides of the respective coil winding core portions 3B as viewed in the rotating direction of the rotor 4.

Figure 5:
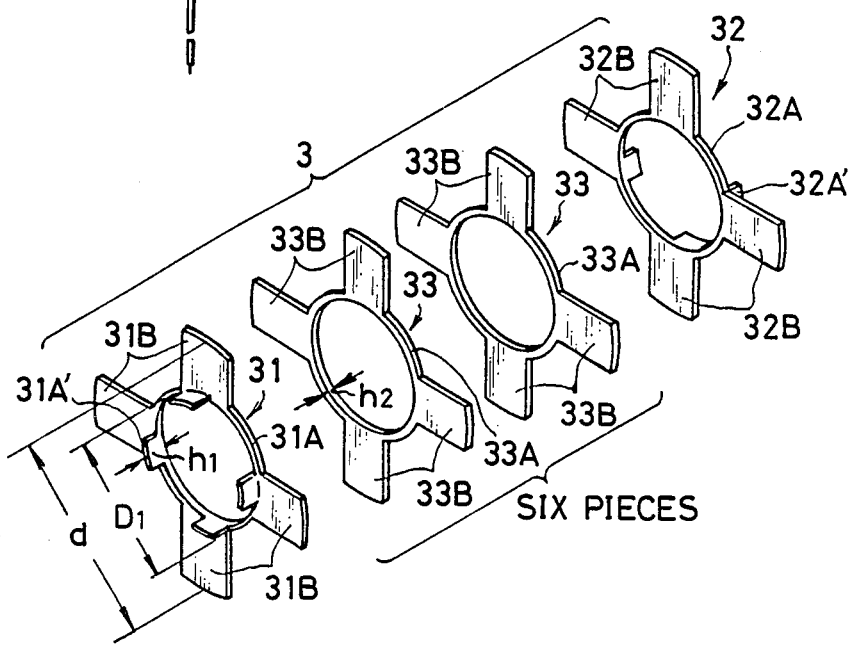
FIG. 5 is an exploded perspective view of the stator core of the motor in FIG. 1.

In this embodiment, as shown by the exploded perspective view of FIG. 5, the stator core 3 is constructed of a combination consisting of two core plate members 31 and 32 which have bilaterally symmetric shapes, and six core plate members 33 which are identical to each other yet different from plates members 31 and 32. The core plate member 31 (32) is so shaped as to have four radial portions 31B (32B) constituting part of the coil winding core portions 3B, and a ring portion 31A (32A) having saliences 31A' (32A') which protrude axially from the inner ends of the corresponding radial portions 31B (32B) in directions perpendicular to the radial directions of the radial portions and which serve as the salient interpole portions 3A'. Preferably, the core plate member 31 (32) is formed from a single material plate by punching, and the saliences 31A' (32A') are formed by notching and extending a ring-shaped part after the punching operation. Each of the core plate members 33 is so shaped as to have four radial portions 33B constituting part of the coil winding core portion 3B, and a ring portion 33A which lies at the inner ends of the radial portions 33B, which is co-planar with the radial portions 33B and equal in thickness thereto and which forms part of the ring-shaped core portion 3A. Each core plate member 33 is preferably formed from a single material plate by means of a punching operation. As the material of which these core plate members 31, 32 and 33 is made, an ordinary rolled steel plate (for example, JIS G3131 or 3141), an electromagnetic soft iron plate (for example, JIS G2504) or a silicon steel plate (for example, JIS H40) is used according to the selling price or required performance of the motor. Further, an Fe-Co-V alloy plate material or the like which is a material of the highest grade is used if allowed from the point of cost. It is also possible to use the above plate materials in combination.

The stator core 3 is constructed as shown in FIG. 4 in such a way that the two core plate members 31 and 32 depicted in FIG. 5 are assembled back to back with the six core plate members 33 sandwiched therebetween. Accordingly, when $h_1$ denotes the thickness of each of the ring portions 31A and 32A including the corresponding saliences 31A' and 32A' and $h_2$ denotes the thickness of the ring portion 33A as indicated in FIG. 5, $(2 h_1 + 6 h_2)$ ought to be selected so as to become substantially equal to the thickness l of the permanent magnet 41 of the rotor 4 as seen in in FIG. 4.

Although, in this embodiment, six core plate members 33 are sandwiched between plate members 31 and 32, the present invention is not restricted to this number. An increase in the number of the pieces is preferable for decreasing the iron loss of the stator and increasing the shaft output of the motor. Conversely, in a case where degradation in the performance such as the shaft output is permissible, the core plate members 33 may number a few or may well all be removed so as to construct the stator core from the two core plate members 31 and 32 only. Furthermore, although in the foregoing embodiment the stator core 3 is constructed of the core plate members 31, 32 and 33 punched from the single material plate, it can also be constructed, if some degradation in performance is permitted, in such a way that the ring-shaped core portion 3A of the stator core 3 is formed as a separate unit, around which the coil winding core portions 3B also formed as separate units are secured by a proper method such as welding.

The stator coils 6 and 6' are disposed on the coil winding core portions of the stator core 3. In the illustrated embodiment, as shown in FIG. 4, the coils 6 and 6' are respectively wound around bobbins 6A and are completed by varnishing, whereupon the resultant bobbins 6A are respectively fitted and fixed on the corresponding coil winding core portions. However, the present invention is not restricted to this measure, but the coils 6 and 6' can also be directly wound on the coil winding core portions 3B by coating the latter with a resin (for example, an epoxy resin). Anyway, the thickness of the coil winding core portions 3B is made less than that of the ring-shaped core portion 3A, so that the outer thickness of the stator coils 6 and 6' can be made thinner than in a prior-art DC brushless motor, and the thinned geometry of the motor itself can be achieved.

In addition, a ferrite magnet, an alnico magnet, or the like are usable as the permanent magnet for the rotor 4 of the present invention.

Figure 6:
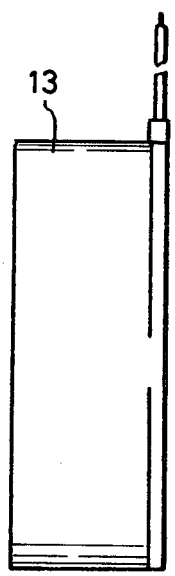
FIGS. 6 and 7 are a side view and a front view respectively in the case where the motor in FIG. 1 is employed for an axial blower.
Figure 7:
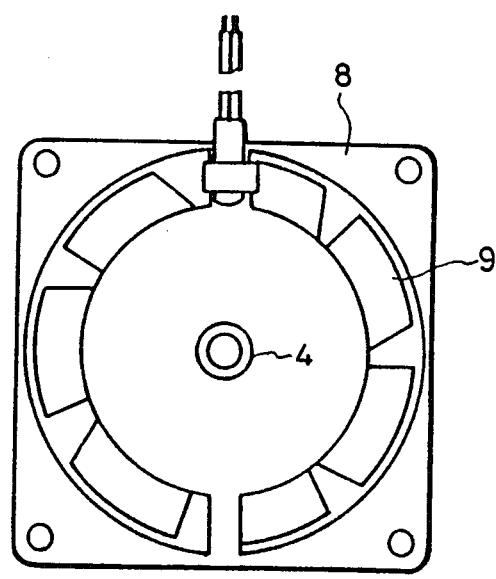

FIGS. 6 and 7 are a side view and a front view respectively, showing an instance in which the motor being the embodiment of the present invention as stated before is mounted on a casing 8, and a fan 9 is attached to the rotor 4 so as to comprise an axial blower.

Figure 8:
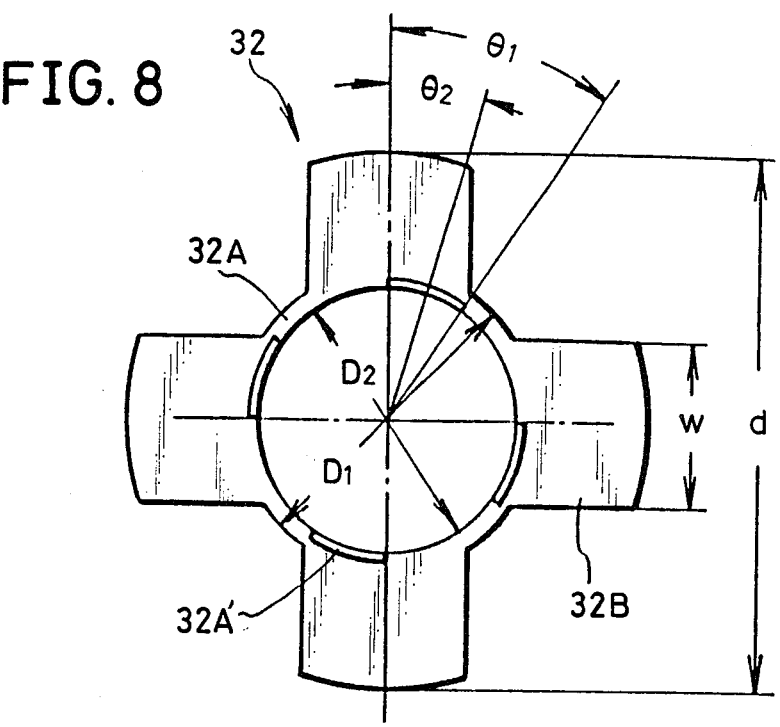
FIG. 8 is a view of one of the core plate members constituting the stator core of the motor in FIG. 1 as seen from the side of the saliences thereof.
Figure 9:
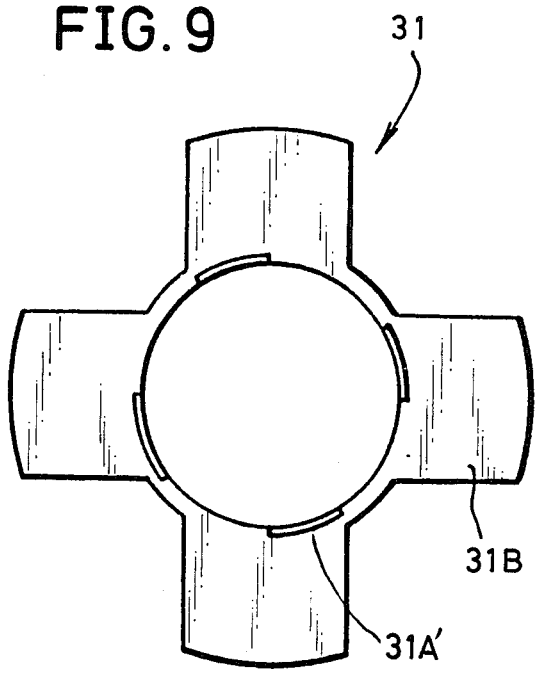
FIG. 9 is a view of another core plate member to pair with the core plate member in FIG. 8 as seen from the side of the saliences thereof.

Next, preferable examples of the shapes of the core plate members 31 and 32 will be described with reference to FIGS. 8 and 9. FIG. 8 is a view of the core plate member 32 as seen from the side of the saliences 32A', while FIG. 9 is a view of the core plate member 31 as seen from the side of the saliences 31A'. The dimensions of the various parts of the core plate member 32 in FIG. 8 are as follows: the dimension d of the outside diameter of the radial portions 32B is 54 mm, the dimension w of the width of each radial portion 32B is 16.5 mm, the dimension $D_1$ of the outside diameter of the ring portion 32A is 28.6 mm, and the dimension $D_2$ of the inside diameter of the ring portion 32A is 26.7 mm. In addition, each salience 32A' extends arcuately over an angular range of $\theta_1 = 40°$ as measured from the center of the radial portions 32B in the rotating direction of the rotor 4, and an angular extent $74_2$ defined between the centers of each salience 32A' and that of the corresponding radial portion 32B is set at 20°. The core plate member 31 in FIG. 9 is the same as the core plate member 32 in FIG. 8 except that the positions of the saliences 31A' are bilaterally symmetric to those of the saliences 32A' of the core plate member 32 in FIG. 8. The dimensions of the various parts of the core plate member 31 in FIG. 9 are equal to those of the corresponding parts of the core plate member 32 in FIG. 8.

Next, the operation of the thin type DC brushless motor according to the present invention will be described with primary reference being made to FIG. 10.

Figure 10:
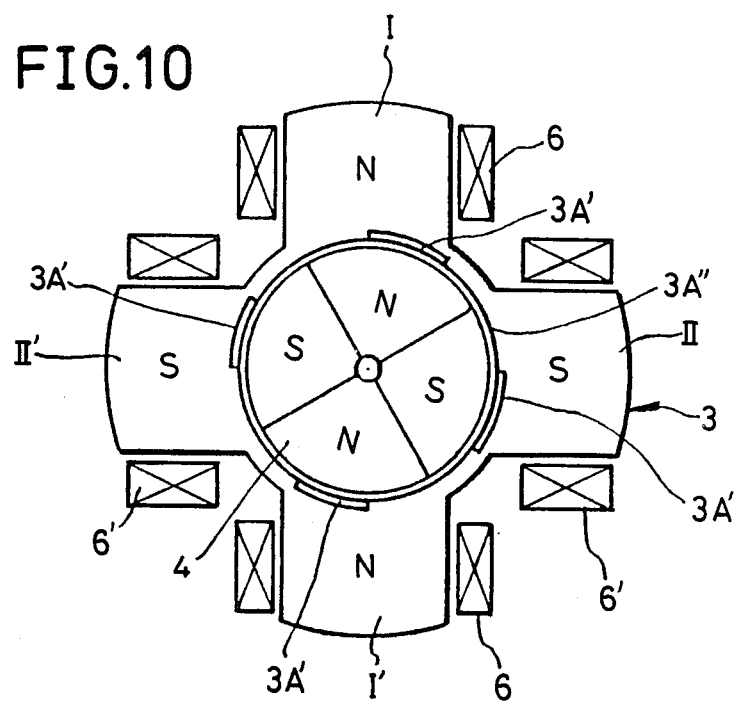
FIG. 10 is a schematic front view for explaining the operation of the motor of the present invention.

As shown by a schematic front view in FIG. 10, the stator coils 6 or 6' are respectively wound in the same direction around one pair of coil winding core portions I—I' or II—II' of the stator core 3 of the foregoing structure. With such a winding mode, when the stator coil pair 6, 6 is energized, the inner surface parts of the stator corresponding to the coil winding core portion pair I—I' become S-poles, and the inner surface parts of the stator corresponding to the coil winding core portion pair II—II' become N-poles. Meanwhile, when the stator coil pair 6', 6' is energized, the inner surface parts of the stator corresponding to the coil winding core portion pair II—II' become S-poles, and the inner surface parts of the stator corresponding to the coil winding core portion pair I—I' become N-poles. The rotor 4 is made of a quadripolar ferrite magnet, which is arranged in the stator core 3 as illustrated.

Figure 11:
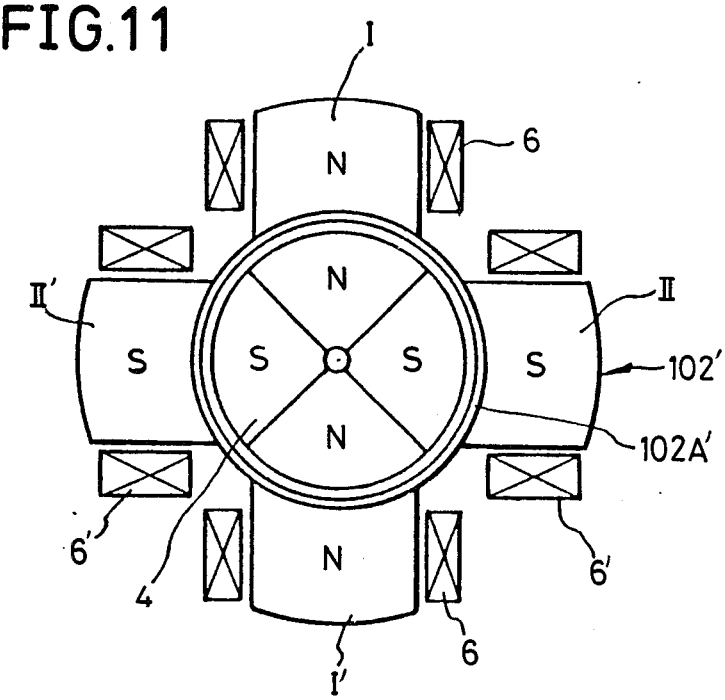
FIG. 11 is a schematic front view for explaining the operation of a motor which has no salient interpole portions and which is compared with the motor of the present invention.
Figure 15:
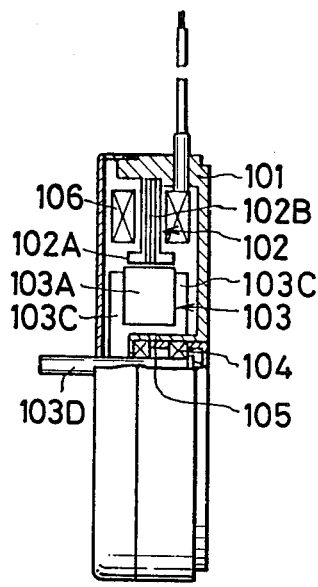
FIG. 15 is a half-sectional side view of a miniature capacitor motor of the prior art.
Figure 16:
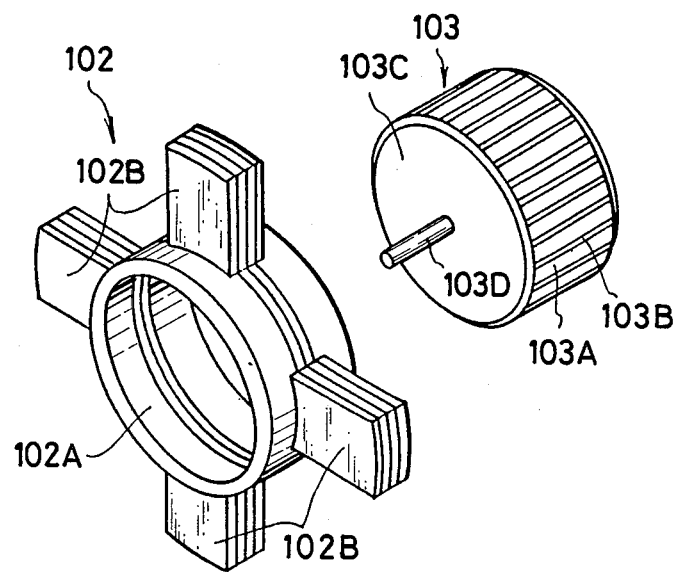
FIG. 16 is an exploded perspective view showing only the stator core and the rotor of the motor in FIG. 15.

Here, before the description of the operation of the motor of the present invention is provided, reference will be had to FIG. 11 for explaining the operation of a thin type DC brushless motor of the same structure as the embodiment of the present invention except that the stator core 3 is replaced with a stator core 102' in which a ring-shaped core portion has no notches as is true of the stator core 102 of the motor explained with respect to FIGS. 15 and 16.

The motor in FIG. 11 is structurally the same as the motor in FIG. 10 except that the ring-shaped core portion 102A' of the stator core 102' is perfectly cylindrical and has no parts corresponding to the saliences 3A' and the notches 3A" in the ring-shaped core portion 3A of the stator core 3 of the motor in FIG. 10. FIG. 11 shows a state in which none of the stator coils 6 and 6' is energized. The permanent magnet type rotor 4 remains stationary with the center of the S-poles thereof held in alignment with the centerline of the coil winding core portion pair II—II' of the stator core. When, the motor is disposed in this state, the pair of stator coils 6' and 6' is energized so that the inner surface parts of the stator corresponding to the coil winding core portion pair II—II' may become S-poles, the permanent magnet type rotor 4 is considered to perform the following three operations:

(1) When the magnetic circuit is quite balanced, the rotor maintains its stationary state without rotating.

(2) When the S-poles of the permanent magnet type rotor shift slightly clockwise, a repulsive force acts in the clockwise direction, and the permanent magnet type rotor rotates in the clockwise direction and then stops when the center of the N-poles thereof has come into alignment with the centerline of the inner surface parts of the stator corresponding to the coil winding core portion pair II—II'.

(3) When the S-poles of the permanent magnet type rotor shift slightly counterclockwise, a repulsive force acts in the counterclockwise direction, and the permanent magnet type rotor rotates in the counterclockwise direction and then stops when the center of the N-poles thereof has come into alignment with the centerline corresponding to the coil winding core portion pair II—II'.

In the case where, as in the motor of FIG. 11, the structure of the stator core of the motor of FIGS. 15 and 16 is adopted without any change, the three operations are executed as stated above, so that the rotating direction is not determined and an enhanced performance cannot be achieved, granted that the motor can have a thin geometry.

The thin type DC brushless motor of the present invention illustrated in FIG. 10 comprises the ring-shaped core portion 3A of the stator core 3 which is formed with the notches 3A" so as to provide the saliences 3A' which serve as the salient interpole portions, so as to thereby achieve both the thinned geometry and the enhanced performance of the motor. The operation of the motor will be described below.

Owing to the shape of the stator core 3 as described before, in the state in which none of the stator coils 6 and 6' is energized, the permanent magnet type rotor 4 is stationary at the point at which, as shown in FIG. 10, the centers of the S-poles thereof are in alignment with the centers of the salient interpoles 3A' of the stator core 3. In this state, the pair of stator coils 6' and 6' are energized so that the stator inner-surface parts of the coil winding core portion pair II—II' may become S-poles. Then, since the S-poles of the permanent magnet type rotor 4 have been stationary and aligned with the salient interpole portions 3A' which are angularly shifted by 20° from the centerline of the coil winding core portion pair II—II', a repulsive force acts in the clockwise direction, and the permanent magnet type rotor 4 accordingly rotates and then becomes stationary when the centers of the N-poles thereof are located in the vicinity of the centers of the interpole portions 3A'. Subsequently, the pair of stator coils 6 and 6 are energized so that the stator inner-surface parts of the coil winding core portion pair I—I' may become S-poles.

Figure 12:
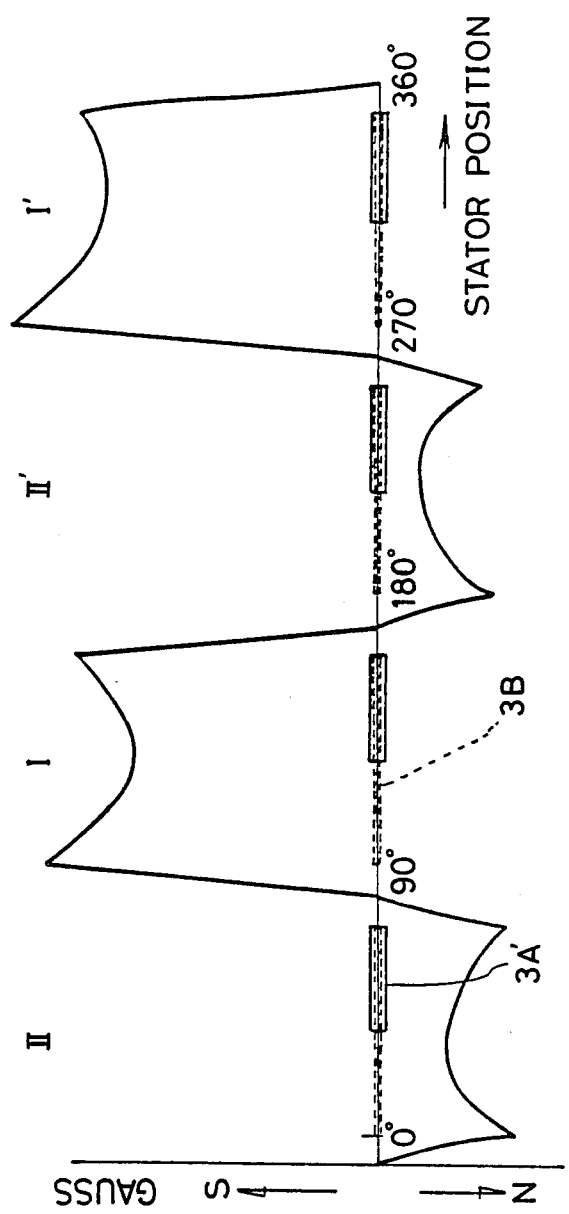
FIG. 12 is a diagram showing an example of the magnetization profile of the stator of the motor of the present invention in FIG. 10.

Then, since the S-poles of the permanent magnet type rotor 4 have been momentarily stationary in the vicinities of the salient interpole portions 3A' which are angularly shifted by 20° from the centerline of the coil winding core portion pair I—I', a repulsive force acts in the clockwise direction, and the permanent magnet type rotor 4 rotates accordingly and then becomes stationary when the centers of the S-poles thereof located in the vicinity of the centers of the salient interpole portions 3A'. FIG. 12 illustrates the magnetization profile of the stator at the time at which the coil winding core portion pair I—I' has been magnetized. In order to maintain the operating principle continuous, the motor is additionally provided with the control circuit 11, and switches 12A and 12B according to which, as elucidated in connection with FIGS. 3 and 4, the stator coil pairs 6, 6 and 6', 6' are alternately energized upon sensing the position of the permanent magnet type rotor 4 by the use of the Hall effect element 10, whereby the operation as the motor can be executed.

In order to compare the performances of the motor of the present invention as shown in FIG. 10 and the motor in FIG. 11, motors to be described below were fabricated by way of example and were studied on an experimental basis:

In FIG. 10, the axial thickness (a dimension l in FIG. 4) of the permanent magnet of the permanent magnet type rotor 4 was set at 8.9 mm, and the outside diameter thereof (a dimension Dr in FIG. 4) at 26.3 mm. In addition, an ordinary rolled steel plate 0.5–0.7 mm thick was punched with a power press, to prepare the core plate members 31, 32 and 33 as shown in FIG. 5. The inside diameters of the ring-shaped portions 31A, 32A and 33A of the respective core plate members 31, 32 and 33 were set at 26.7 mm, the outside diameters of the ring-shaped portions 31A, 32A and 33A were set at 28.6 mm, the thicknesses (dimensions $h_1$ in FIG. 5) of the ring portions 31A and 32A were set at 2.8 mm, and the other geometries were made the same as stated before in connection with FIGS. 8 and 9. The stator core 3 was assembled by placing the core plate members 31 and 32 back to back with the six core plate members 33 inserted therebetween. Besides, magnet wires 0.11 mm in diameter were respectively wound 650 times around the bobbins 6A separately formed, and the resultant structures were molded and completed by varnishing, whereupon the finished structures were fitted on the coil winding core portions 3B of the stator core 3. Thus, the stator was constructed. The rotor 4 was fitted on the sleeve 21 of the frame 2 having an outside diameter (a dimension D in FIG. 4) of 60 mm, the stator was press-fitted within the frame 2, and a cover plate 7 was mounted as shown in FIGS. 1 and 2, whereby the motor whose axial thickness l was 18 mm was obtained.

On the other hand, the motor schematically shown in FIG. 11 was fabricated which was structurally the same as the above-stated motor of the present invention except that the ring-shaped portion 102A' of the stator core 102' was not formed with the saliences and the notches.

Figure 13:
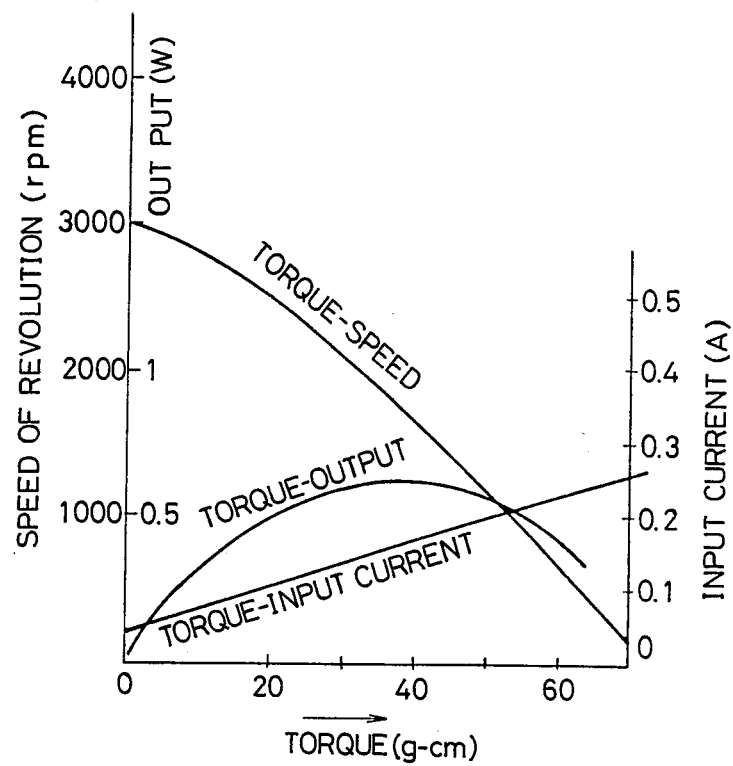
FIG. 13 is a diagram showing several characteristic curves of an example of trial manufacture of the motor of the present invention.

As to the above example of the motor according to the present invention manufactured by way of experiments, there were found a torque-speed characteristic curve, a torque-output curve and a torque-input current curve, and these respective curves are shown in FIG. 13. Likewise, as to the example of the experimental manufacture of the motor in FIG. 11 having no saliences and no notches, there were found a torque-speed characteristic curve, a torque-output curve and a torque-input current curve, and these respective curves are shown in FIG. 14.

Figure 14:
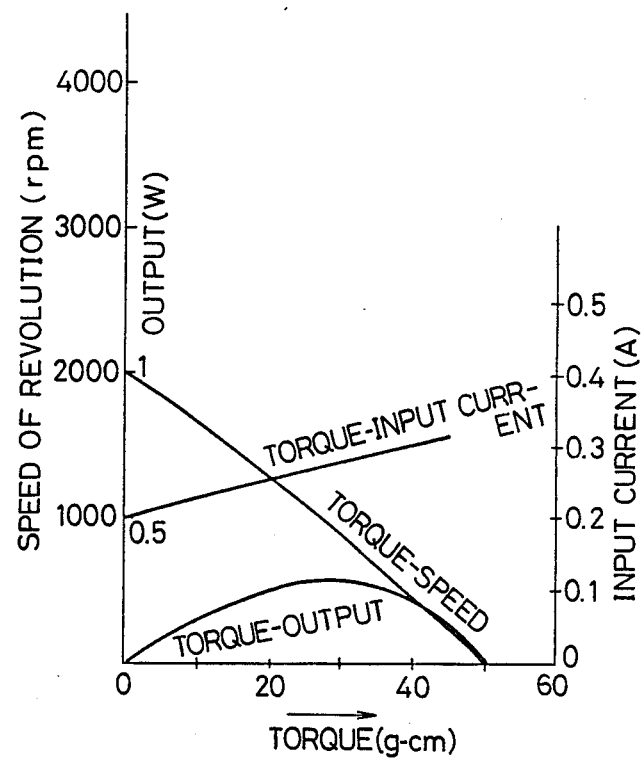
FIG. 14 is a diagram showing several characteristic curves of an example of trial manufacture of the motor having no salient interpole portions as seen in FIG. 11.

As understood by comparing the corresponding curves in FIGS. 13 and 14, especially near a torque of 20 g-cm in the case of use as fan motors, the motor according to the present invention as illustrated in FIG. 10 is much higher in speed and much less in input current than the motor having no salient interpole portion in FIG. 11. Moreover, with the motor of FIG. 10, problems such as failure to start did not occur at all, whereas with the motor having no salient interpole portion as illustrated in FIG. 11, problems such as failure to start and reverse rotation were sometimes involved at starting.

Since the motor of the present invention is constructed as stated before, it can achieve a thin geometry in comparison with the prior-art motor and can also achieve enhanced performance features such as a higher speed and a lower input current, and besides, it can solve problems such as failure to start.

Obviously, many modifications and variations of the present invention are possible in light of the above teachings. It is therefore to be understood that within the scope of the associated claims, the present invention may be practiced otherwise than as specifically described herein.

What is claimed is:

1. A thin type DC brushless motor, comprising:
   a permanent magnet rotor; and
   a stator core disposed concentrically with said rotor and including, a ring-shaped portion which annularly surrounds said permanent magnet rotor, and a plurality of coil winding portions which extend radially outwardly from an outer peripheral portion of said ring-shaped portion so as to support stator coils thereon;
   said coil winding portions having a predetermined axial length which, when said stator coils are energized, define primary poles for cooperating with poles of said permanent magnet rotor so as to cause rotation of said permanent magnet rotor in a predetermined rotational direction, and including a plurality of salient interpole portions, having a predetermined axial length greater than said predetermined axial length of said primary pole coil winding portions, angularly offset with respect to said primary pole portions so as to retain said permanent magnet rotor in a predisposed position relative to said primary pole portions of said stator core such that said permanent magnet rotor poles are angularly offset with respect to said primary pole portions of said stator core in said predetermined rotational direction when said stator coils are de-energized whereby starting of said motor is facilitated when said stator coils are energized.

2. A thin type DC brushless motor as claimed in claim 1, wherein said stator core is formed in such a way that two core plate members of bilaterally symmetric shapes, each of which has a plurality of radial portions constituting halves of said coil winding core portions and a ring portion having saliences that protrude from inner ends of said radial portions to one side of said stator in a direction perpendicular to the radial direction of said radial portions and that serve as said salient interpole portions, are assembled together back to back.

3. A thin type DC brushless motor as claimed in claim 2, wherein:

said radial portions of said core plate members and said saliences are integrally formed from a single piece of plate material.

4. A thin type DC brushless motor as claimed in claim 1, wherein said stator core is formed in such a way that two core plate members of bilaterally symmetric shapes, each of which has a plurality of radial portions constituting parts of said coil winding core portions and a ring portion having saliences that protrude from inner ends of said radial portions to one side of said stator in a direction perpendicular to the radial direction of said radial portions and that serve as said salient interpole portions, are assembled together back to back so as to sandwich therebetween at least one core plate member which has a plurality of radial portions constituting parts of said coil winding core portions and a ring portion disposed at the inner ends of said radial portions, being equal in thickness to said radial portions thereof and forming a part of said ring-shaped core portion.

5. A thin type DC brushless motor as claimed in claim 1, wherein said coil winding core portions are provided in a number of at least four.

6. A thin type DC brushless motor as set forth in claim 5, wherein:
said four coil winding core portions are substantially equiangularly disposed about said permanent magnet rotor at 90° intervals.

7. A thin type DC brushless motor as set forth in claim 5, wherein:
said permanent magnet rotor comprises a quadripolar ferrite magnet having four poles for respectively cooperating with said four primary poles and said four salient interpoles of said four coil winding core portions of said stator.

8. A thin type DC brushless motor as set forth in claim 1, wherein:
said primary pole portions of said stator core and said salient pole portions of said stator core have angular overlapping arcuate extents as viewed in said direction of rotation of said permanent magnet rotor.

9. A thin type DC brushless motor as set forth in claim 8, wherein:
said angular arcuate extent of said salient interpole portions is approximately 40°.

10. A thin type DC brushless motor as set forth in claim 8, wherein:
said overlapping arcuate extent of said salient interpole portions relative to said primary pole portions is approximately 20° as measured from a radially extending centerline of each of said primary pole portions to a radially extending centerline of each of said associated salient interpole portions.

11. A thin type DC brushless motor as set forth in claim 1, further comprising:
integrated circuit, Hall effect, and switching means for controlling said energization of said stator coils.

12. A thin type DC brushless motor as set forth in claim 1, wherein:
said permanent magnet rotor comprises a quadripolar ferrite magnet.

13. A thin type DC brushless motor as set forth in claim 1, wherein:
said salient interpole portions extend axially from both front and rear surfaces of said stator core.

* * * * *